Oct. 27, 1936.                C. KELLER                 2,058,993
             LABYRINTH PACKING FOR ROTATING MACHINE PARTS
                         Filed Aug. 24, 1935

Inventor
Curt Keller

By
Attorneys

Patented Oct. 27, 1936

2,058,993

UNITED STATES PATENT OFFICE 2,058,993

LABYRINTH PACKING FOR ROTATING MACHINE PARTS

Curt Keller, Zurich, Switzerland

Application August 24, 1935, Serial No. 37,765
In Austria August 29, 1934

2 Claims. (Cl. 286—10)

This invention relates to improvements in labyrinth packing for rotating machine elements, particularly the shafts of steam and gas turbines.

The invention is an improvement on the packing disclosed in Swiss patent No. 174,155, Dec. 31, 1934, according to which, one of the two relatively rotatable elements to be sealed carries a series of annular flanges forming an annular comb, which comb is encircled without substantial initial clearance by an annulus of carbon carried by the other of the two relatively rotatable elements. The carbon rings are conveniently segmental but are so closely assembled as to provide what is in effect a continuous carbon annulus. Thermal expansion of the flanges during running, and the inevitable whip of the rapidly rotating shaft cause the flanges to cut grooves in the carbon annulus, and the form of these grooves is inherently favorable to effective labyrinth sealing of the interval between the two relatively rotatable members by producing a labyrinth seal between the flanges and the carbon ring. In this way the seal is self fitting, and frictional heating and wear are avoided, or at least kept to a practicable minimum.

In the prior construction the material of which the combs were constructed had a higher coefficient of thermal expansion than the carbon and the combs were constructed in one piece.

The present invention is based on the discovery that better results are secured if the material of which the combs are constructed has a coefficient of thermal expansion higher than either of the two relatively rotatable elements between which the seal is interposed (the shaft and housing, in the case of a turbine). When this is the case it becomes possible to construct the comb of a series of thin separately formed annular discs, retained between spacing rings, fixed to the shaft or equivalent rotary member.

Exemplary embodiments of the invention will now be described with reference to the accompanying drawing:—

Figure 1:
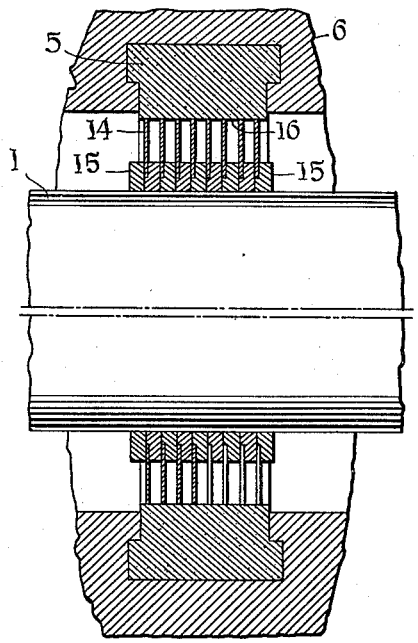
Fig. 1 is an axial section through a labyrinth packing in which the carbon ring has a cylindrical inner surface.

Referring first to Fig. 1, the rotary shaft to be sealed is indicated at 1. It may be assumed to be a turbine shaft. A portion of the encircling housing is indicated at 6 and carries fixedly mounted in an annular undercut recess the carbon annulus 5. The ring commonly would be of segmental construction, but as segmental construction is not a novel feature of this invention, but is disclosed in the Swiss patent mentioned, no attempt is made to illustrate it.

The inner surface 16 of the carbon ring is a right circular cylinder. The comb is constructed of a series of thin annular discs retained on shaft 1 between spacer rings 15, the rings 15 being fixed on the shaft to clamp the discs, in any suitable manner.

The discs 14 are of such diameter that when initially assembled with the encircling ring 5, no clearance, or substantially none is afforded. The discs 14 are however of a material whose coefficient of thermal expansion markedly exceeds the thermal coefficients of the parts 1, 15 and 6 (the part 15 being in effect a part of shaft 1).

Consequently when the turbine or other device is heated up, the discs 14 expand and groove the carbon ring 5 much more effectively than is the case where the flanges have a thermal coefficient of expansion approximating those of the shaft 1 and housing 6.

Figure 2:
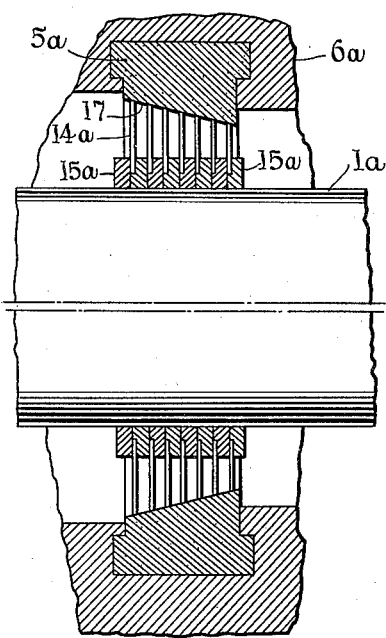
Fig. 2 is a similar view of a packing modified to the extent that the carbon ring has a conical inner surface.

In Fig. 2 similar parts are given the same reference numerals as in Fig. 1 but with the letter a. The only substantial difference is that the inner surface 17 of the carbon ring 5a is a circular cone and the discs 14a are graduated in diameter to correspond. This construction is particularly adapted for use where thermal expansion of shaft 1a (or other condition incidental to the running of the machine) causes the discs 14 to be displaced slightly in the direction of the axis of the shaft. The parts are so contrived that such shifting is toward the apex of conical surface 17.

Figure 3:
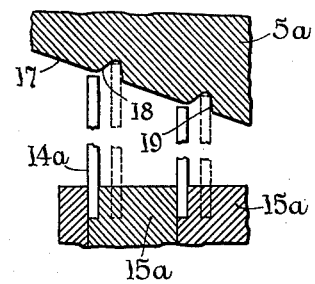
Fig. 3 is a diagram indicating the action of the embodiment shown in Fig. 2.

Fig. 3 illustrates the effect in an exaggerated degree, the discs 14a being shown in full lines in their cold position and in dotted lines in the position assumed when hot. Stating direction with reference to Fig. 3, as the discs 14a move to the right under rising temperature they also expand cutting triangular grooves in the carbon ring 5a. This effect is assisted by the conical form of surface 17. The long narrow throttling space indicated at 19 produces an effective seal, which is maintained under all conditions.

Care should be taken to see that, if the carbon ring 5 or 5a be segmental as is usually the case, the segments are closely juxtaposed, so that intervening gaps are avoided.

In the construction shown in Fig. 2 adjustment can be effected by relative axial displacement of discs 14a and ring 5a which may be produced by shifting rings 15a on shaft 1a.

While carbon has been specified as the material for rings 5 and 5a other substances having similar physical characteristics might be substituted.

One advantage of the invention is that the carbon rings 5, 5a, and the discs 14, 14a, are readily and quickly replaceable, and are inexpensive thus reducing the cost of spare parts to be stocked, and reducing periods of interruption of service.

What is claimed is:

1. In a shaft seal for steam and gas turbines and the like, the combination of two relatively rotatable members, one encircling the other; a conic annulus having physical properties approximating those of carbon carried by one of said members; and an annular comb opposed to said conic annulus and conforming to the taper thereof, said comb being carried by the other member and having a coefficient of thermal expansion higher than that of either member, the parts being so arranged, that when the comb is initially rotated and expanded by heat its peripheries cut relatively deep labyrinth grooves in said annulus from which grooves the comb retreats when cooled, whereby clearance is thereafter afforded under cool starting conditions, and close restriction of the labyrinth is afforded when the comb is heated under normal running conditions.

2. The combination defined in claim 1 in which the parts are so arranged that axial displacement produced by thermal expansion of the relatively rotatable members, will shift the comb toward the annulus.

CURT KELLER.